US012445840B2

(12) United States Patent
Logan et al.

(10) Patent No.: US 12,445,840 B2
(45) Date of Patent: Oct. 14, 2025

(54) WIRELESS NETWORK ATTRIBUTES RECORDS FOR DEVICE REGISTRATION AND POLICY IMPLEMENTATION

(71) Applicant: Charter Communications Operating, LLC, St. Louis, MO (US)

(72) Inventors: William Logan, Overland Park, KS (US); Loay Kreishan, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/612,550

(22) Filed: Mar. 21, 2024

(65) Prior Publication Data

US 2024/0236672 A1     Jul. 11, 2024

Related U.S. Application Data

(62) Division of application No. 17/515,810, filed on Nov. 1, 2021, now Pat. No. 11,968,527.

(51) Int. Cl.
*H04W 12/06* (2021.01)
*H04W 48/16* (2009.01)
*H04W 60/00* (2009.01)

(52) U.S. Cl.
CPC .......... *H04W 12/06* (2013.01); *H04W 48/16* (2013.01); *H04W 60/00* (2013.01)

(58) Field of Classification Search
CPC ..... H04W 12/06; H04W 48/16; H04W 60/00; H04W 48/20
See application file for complete search history.

(56) References Cited

U.S. PATENT DOCUMENTS

2006/0077986 A1    4/2006  Rune
2021/0360371 A1*  11/2021  Qiao ..................... H04W 4/029

OTHER PUBLICATIONS

IEEE 802.11u Standard, "Part 11: Wireless LAN Medium Access Control (MAC) and Physical Layer (PHY) Specifications, Amendment 9: Interworking with External Networks." (Feb. 2011): 1-190.

* cited by examiner

*Primary Examiner* — Diane D Mizrahi
(74) *Attorney, Agent, or Firm* — Mendelsohn Dunleavy, P.C.; Steve Mendelsohn

(57) ABSTRACT

Prior to associating with a wireless network, a wireless device receives from a network access point, a message containing information identifying (i) identity of the network and (ii) network policies; retrieves the information from the message; based on the network identity, determines whether a network attributes record for the network already exists in the device. If not, the device creates a temporary network attributes record for the network. Based on the network policies, the device attempts to associate to and authenticate the network. After successfully associating to and authenticating the network, the device determines whether the network attributes record for the network has expired. If not, the device renews the network attributes record and implements the network policies stored in the network attributes record If the network attributes record has expired, then the device deletes the network attributes record and implements default network policies for the wireless network.

14 Claims, 5 Drawing Sheets

WIRELESS NETWORK ATTRIBUTES RECORDS FOR DEVICE REGISTRATION AND POLICY IMPLEMENTATION

CROSS-REFERENCE TO RELATED APPLICATIONS

This is a divisional of co-pending application Ser. No. 17/515,810, filed on Nov. 1, 2021, the teachings of which are incorporated herein by reference in their entirety.

BACKGROUND

Field of the Disclosure

The present disclosure relates to wireless communications and, more specifically but not exclusively, to wireless local area networks (WLANs) such as Wi-Fi networks that conform to the IEEE 802.11 family of standards.

Description of the Related Art

This section introduces aspects that may help facilitate a better understanding of the disclosure. Accordingly, the statements of this section are to be read in this light and are not to be understood as admissions about what is prior art or what is not prior art.

Today, there is no way for Wi-Fi mobile devices (aka wireless devices) to distinguish and identify the network location, network type, available services on the network, a specific access point (AP) or wireless router, or network operator name (usually referred to as the visited network provider) prior to engaging a network. Some wireless services that require this information have implemented proprietary methods on the wireless device to speculate about the network type and estimate the general location of the network. These methods depend on statistically weighted time usage corresponding with the wireless network medium access control (MAC) ID to estimate the device's location and the network type. Devices that support IEEE 802.11u can utilize the Generic Advertisement Service (GAS) to obtain information from the network using the Access Network Query Protocol (ANQP). However, ANQP can be used only if both the wireless device and the network support IEEE 802.11u and are within the limits for ANQP.

The existing IEEE 802.11u standards require the wireless device to engage the network in order to query for information. For most wireless networks and devices that do not support the existing IEEE 802.11u standards, there is no way to identify the network type, the \network provider, or the specific AP prior to network engagement. A more-accurate and reliable method to identify network attributes became essential after 2019 when device manufacturers introduced aggressive network privacy policies on all Wi-Fi networks like MAC randomization and warning messages regardless of the type or location of the network. This is because the wireless device could not identify network type or location prior to associating to the network.

SUMMARY

Problems in the prior art are addressed in accordance with the principles of the present disclosure by providing a technique that allows wireless devices to identify the WLAN network type prior to associating to the network. According to certain embodiments, a wireless device uses vendor-specific Beacon Information Elements (BIEs) and configuration profiles containing network provisioning data, to identify network parameters and make decisions regarding network selection, association, network policies for security and privacy, and enhanced analytics. An algorithm implemented by the wireless device uses configured Vendor-Specific Elements (VSE) within IEEE 802.11 beacon frames or probe responses to create a network attributes record.

The algorithm combines VSEs with configuration profiles to create a unique network attributes record that contains essential network identifiers and key network attributes required by the device, such as network type, network name, provider's domain name, network access point identifier, and/or residential Wi-Fi router identifier, to select a network and implement the correct network policies. The algorithm utilizes logical functions, such as the network selection function or the policy selection function utilizing the network identifiers, to determine important network attributes like network type (for example, public hotspot or private residential), available services (for example, VoIP (voice over internet protocol) or Emergency 911), location, provider name, and information used in logging and analytics, such as service set identifier (SSID), authentication type, and data usage. These values can be used to select a network, associate with a network, and implement security features, such as authentication and authorization of a device to access a network and authorize the use of a service, enforcing network privacy policies, logs, and analytics records, such as obscuring the user's and the wireless device's identities at the time of network scanning (search) and maintaining network performance logs. The algorithm stores network information provided by the network operator in the network attributes record combined with the network configuration information on the device and usage patterns like weighted time usage. These records hold valuable information that can be used by a wireless device's applications to identify network attributes without compromising the wireless device's security or privacy.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

In a conventional IEEE 802.11-based WLAN, an access point of that WLAN periodically broadcasts beacon frames that inform nearby wireless devices of the presence and availability of that WLAN. When the user of a wireless device manually selects that WLAN for the first time, if the wireless device successfully authenticates and associates with that WLAN, then the wireless device can create and store a configuration profile for that WLAN that contains information needed to authenticate and associated with that WLAN in the future. If and when the wireless device subsequently returns to the coverage area of that WLAN, upon receipt of a beacon frame, the wireless device can automatically recognize that the wireless device already has a configuration profile for that WLAN and automatically initiate the process of authenticating and associating with that WLAN.

According to certain embodiments of the present disclosure, beacon frames are used to convey additional information about the corresponding WLAN that wireless devices can use to execute pre-configured network policies that enhance the functionality of the association of a wireless device with a WLAN. The term "network policies" refers to a collection of rules that govern the behaviors of network devices, which rules are enforced by the network.

Figure 1:
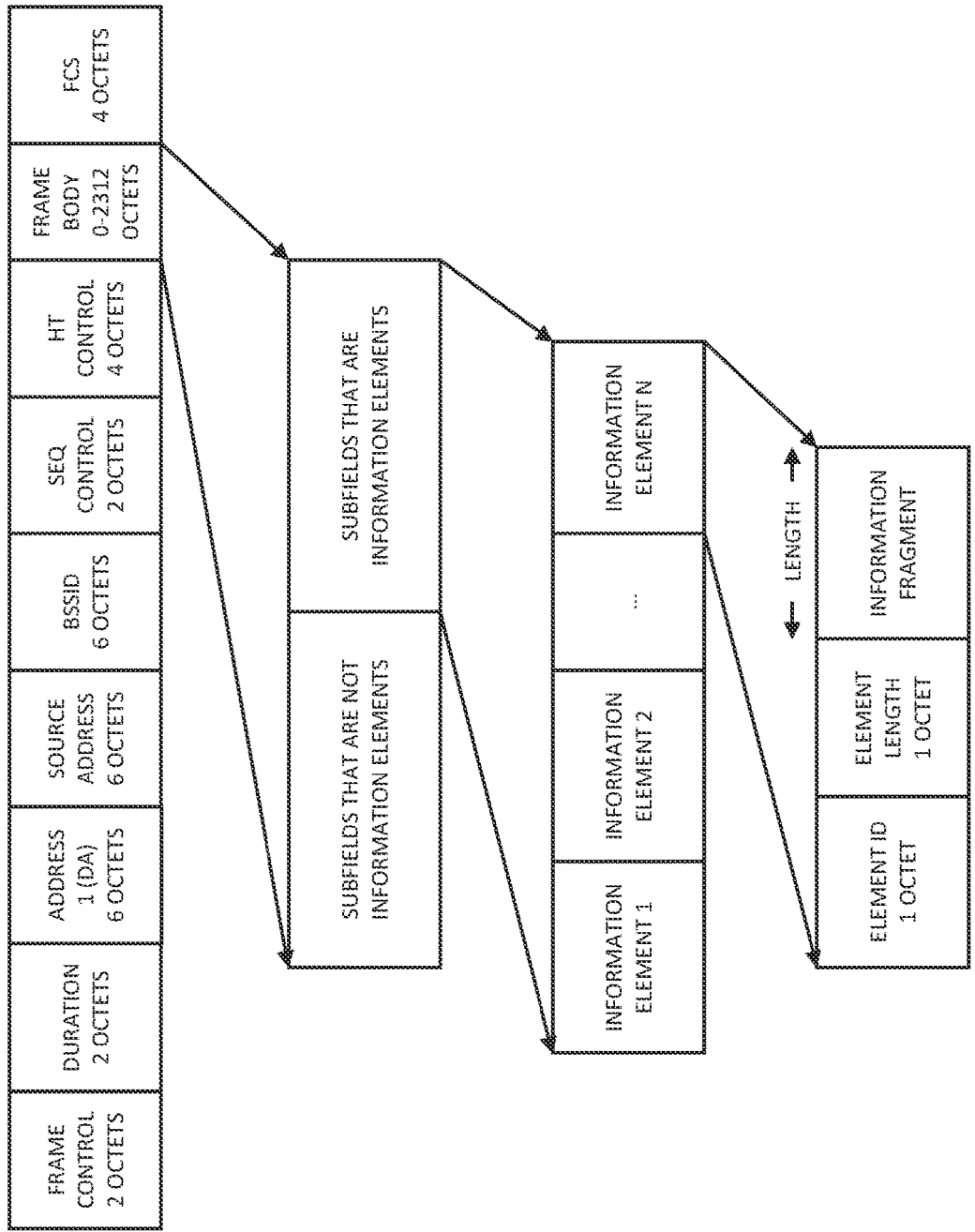
FIG. 1 shows a representation of the format of a beacon frame according to the IEEE 802.11 family of standards.

FIG. 1 shows a representation of the format of a beacon frame 100 according to the IEEE 802.11 family of standards. The beacon frame 100 is one of the management frames in IEEE 802.11-based WLANs. Transmitted by an access point or wireless router in configured intervals, a beacon frame 100 contains information about the wireless network. Beacon frames may be transmitted periodically and serve to announce the presence of a wireless LAN and to synchronize the members of the service set.

For networks that do not advertise the wireless network name (i.e., the Service Set Identifier (SSID)), a probe request is used instead of beacon frames. In that case, a wireless device sends a probe request, and an AP that receives the probe request, sends a probe response to advertise the SSID, supported data rates, encryption types if required, and other IEEE 802.11 Information Elements (IEs), where a probe response has the same format as the beacon frame 100 of FIG. 1. A probe response is targeted to the wireless device that transmitted the probe request, while a beacon frame is broadcast to all wireless devices in the coverage area.

As shown in FIG. 1, the Frame Body field of a beacon frame 100 can be anywhere from 0 to 2312 octets long, where the Frame Body field can contain zero, one, or more subfields that are not Information Elements and/or zero or up to N subfields that are Information Elements, where, for example, N=39 for IEEE 802.11n-based WLANs, as long as the total length of the Frame Body field is no more than 2312 octets long. In particular, the IEEE 802.11 standards allow AP manufacturers to use the Frame Body field to add up to 253 bytes of vendor-specific Beacon Information Elements (BIEs) and probe response Information Elements (IEs). This feature is used to define a special information element referred to herein as a Vendor-Specific Element (VSE) for broadcasting information. If necessary, information to be conveyed using VSEs is fragmented into 251-byte chunks (with one byte used to identify the VSE (e.g., with ID=221) and one byte used to define the length of the VSE in numbers of bytes) and sent in successive beacon frames or probe responses.

VSEs are left to the manufacturer to include data about the device and the network. According to certain embodiments of the disclosure, VSEs in a beacon may contain one or more of: Provider Name (e.g., Spectrum, Xfinity, Cox, etc.), the Service Type Network (e.g., cable, fiber, DSL, satellite, etc.), Wireless Network Type (e.g., residential, enterprise, public, etc.), and the AP ID (e.g., device serial number or the wired Ethernet or LAN interface MAC address, if available). Depending on the implementation, this information can be transmitted in VSEs as a code, string, or attribute-value pair.

Wireless device manufacturers can utilize these parameters within their logic of identifying networks and implement network policies, like MAC randomization, with high accuracy. This is something that can be added to home routers to include in the VSEs of beacon frames and probe responses.

The information provided within a beacon frame 100 can be customized by the device manufacturer or the carrier. Certain embodiments of the present disclosure utilize VSEs to transmit some or all of the following information:

Network location: Can be location address or coordinates.
Network type: For example, private, residential, enterprise, commercial, hospitality, medical, education, transport.
Network provider's name or ID: For example, operator name, organization identifier, operator's domain name, Public Land Mobile Network (PLMN).
Network ID: Reflects the location or venue regardless of the value of the SSID or the device's MAC address. This value does not change when swapping the device or changing the SSID.
Network device ID: Identifies devices within the network that share the same Network ID.
Network services provided by the operator and supported by the network: For example, Wi-Fi calling, VoIP, Emergency 911, location, and cellular offloading.

These values are provided by the operators and configured on the Customer Premises Equipment (CPE) or AP to be included in the VSEs. Depending on the implementation, each of these attributes can be used in the process of selecting one or more network policies for the wireless device.

Figure 2:
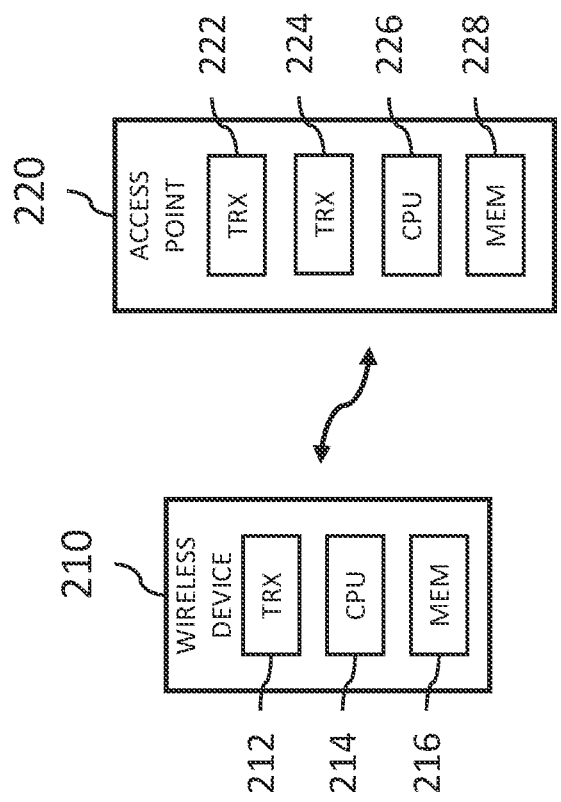
FIG. 2 is a simplified hardware block diagram of an example wireless local area network (WLAN) in which a wireless device is located within the coverage area of an access point (AP) of the WLAN.

FIG. 2 is a simplified hardware block diagram of an example wireless local area network (WLAN) 200 in which a wireless device 210 is located within the coverage area of an access point (AP) BC of the WLAN 200. Those skilled in the art will understand that there may be other wireless devices (not shown) within the coverage area of the AP BC and that the AP BC is connected to a backend communication system (not shown) that supports communication between the AP BC and wireless devices within its coverage area as well as between the AP BC and the outside world. In addition, although not shown in FIG. 2, the WLAN 200 may have additional APs as well as other backend elements that support the functionality of the WLAN 200 for communicating with multiple other wireless devices.

As shown in FIG. 2, the wireless device 210 includes (i) a wireless transceiver (TRX) 212 for transmitting wireless signals to and receiving wireless signals from the AP BC and (ii) a processor (CPU) 214 for controlling the operations of the wireless device 210, including the processing of outgoing and incoming signals to and from the AP BC based on software code stored in the wireless device's memory (MEM) 216. Analogously, the AP BC includes (i) a wireless transceiver 222 for transmitting and receiving wireless signals to and from the wireless device 210, (ii) a backend transceiver 224 for transmitting and receiving (wired or wireless, depending on the implementation) signals to and from the backend communication system (not shown), and (iii) a processor 226 for controlling the operations of the AP BC, including the processing of outgoing and incoming signals to and from the wireless device 210 and the backend communication system based on software code stored in the AP's memory 228.

In a WLAN, a wireless device that wants to associate to a network, searches and scans for a broadcast service set identifier (SSID) that matches a preconfigured SSID on the wireless device. Prior to associating to the network, the wireless device's connection manager looks through the scan results for an existing attributes record based on network Name, ID, or SSID. If no attributes record is available for the specific network, then the wireless device will implement its default policy. Otherwise, the wireless device will proceed to identify the network attributes within the attributes record. Each configuration profile on the wireless device can have an associated attributes record. A configuration profile can have a specific policy rule (policy element) associated with the corresponding network. The connection manager checks if a specific policy element exists for the network. If a policy element exists, then the wireless device will implement the policy. If a policy element does not exist, then the connection manager will implement the default policy configured on the wireless device.

Figure 3:
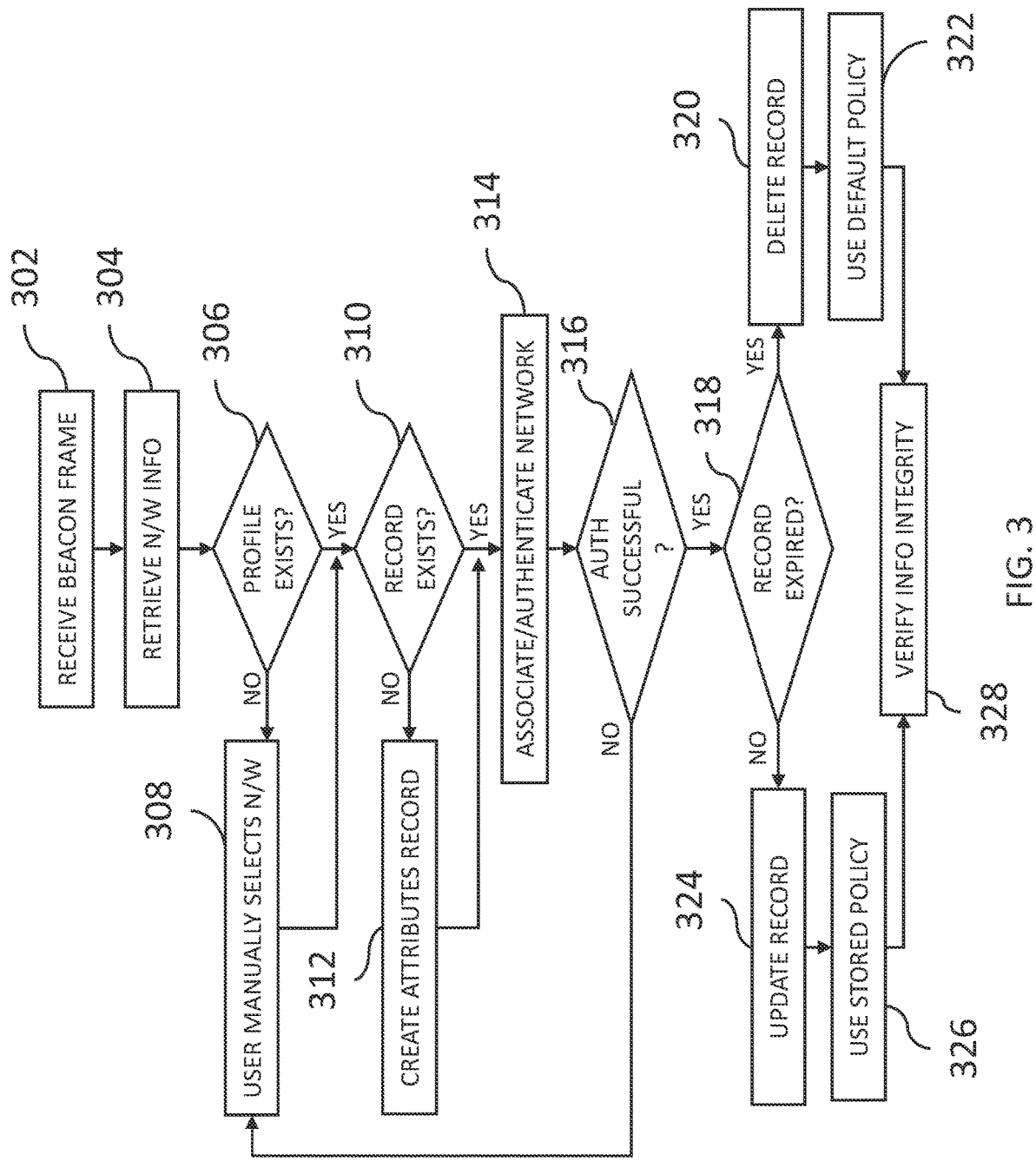
FIG. 3 is a flow diagram representing the WLAN association and authentication processing performed at the wireless device of FIG. 2 according to one possible embodiment of the present disclosure in which the access point periodically transmits instances of the beacon message of FIG. 1.

FIG. 3 is a flow diagram representing the WLAN association and authentication processing performed at the wireless device 210 of FIG. 2 according to one possible embodiment of the present disclosure in which the access point BC periodically transmits instances of the beacon message 100 of FIG. 1.

At step 302, the wireless device 210 receives a beacon frame 100 from the AP BC. At step 304, the wireless device 210 retrieves network information stored in the information elements of the Frame Body field of the beacon frame 100, where the network information includes a Network ID that identifies the WLAN 200. At step 306, the wireless device 210 uses the Network ID to determine whether it already has a configuration profile for the WLAN 200 stored in its memory 216.

If so, that means that the wireless device 210 has previously successfully associated with the WLAN 200 and retained the stored configuration profile for the WLAN 200. In that case, processing proceeds to step 310. Otherwise, there is no stored configuration profile for the WLAN 200. In that case, at step 308, the wireless device 210 presents a list of available WLANs to the user, who, in this scenario, manually selects the WLAN 200. Processing then continues to step 310.

At step 310, again using the Network ID retrieved from the beacon frame 100, the wireless device 210 determines whether an existing attributes record for the WLAN 200 is stored in its memory 216. According to certain embodiments of the present disclosure, an attributes record is a special data structure used to store information transmitted as VSEs to the wireless device 210 in beacon frames 100. Note that, in some implementations, the attributes record is part of the configuration profile for the corresponding WLAN 200, while, in other implementations, the attributes record is stored separate from the configuration profile. In any case, if a stored attributes record already exists for the WLAN 200, then processing proceeds to step 314. Otherwise, at step 312, the wireless device 210 creates and stores a (temporary) attributes record for the WLAN 200, where the attributes record includes and a timestamp identifying the date and time that the attributes record was created as well as other network information for the WLAN 200 retrieved from the beacon frame 100 such as the Network ID, the network policies, the selected randomized MAC, the device host name, and/or the network priority. As a temporary record, the attributes record of step 312 may be stored in the device's volatile memory, while the attributes record stored in step 324 (described below) is stored in the device's main memory and maintained there until deleted by the application. Processing then continues to step 314.

At step 314, the wireless device 210 attempts to associate with and authenticate the WLAN 200 using conventional WLAN processing. At step 316, the wireless device 210 determines whether association and authentication were successful. If not, then processing returns to step 308 to give the user the opportunity to manually re-select the same WLAN 200 or a different WLAN. If association and authentication were successful, then processing proceeds to step 318.

At step 318, the wireless device 210 compares the timestamp in the attributes record for the WLAN 200 to the current date and time to generate a duration since the wireless device 210 last successfully associated with the WLAN 200 to determine whether the attributes record has expired. If the wireless device 210 determines that the duration is greater than a (programmable) threshold value (e.g., a specified number of days or weeks), then, for security reasons and to make sure that the attributes record is up to date, it is deemed to have been too long since the wireless device 210 has associated with the WLAN 200. In that case, at step 320, the wireless device 210 deletes the attributes record for the WLAN 200, and, at step 322, the wireless device 210 implements a set of (programmable) default network policies stored in its memory 216. According to certain embodiments of the present disclosure, the wireless device 210 is pre-configured with a stored set of default network policies for all WLANs to be implemented in the absence of an attributes record that contains specific network policies for the WLAN 200.

If the wireless device 210 determines at step 318 that the duration is less than the threshold value, then, at step 324, the wireless device 210 updates the timestamp in the attributes record for the WLAN 200 to the current time and stores any new network information retrieved from the beacon frame 100, and, at step 326, the wireless device 210 implements the set of network policies stored in the attributes records.

At step 328, the wireless device 210 verifies the integrity of the information by determining whether the service provider has made any updates on any of the attributes and whether the device needs to update any of the attribute values in the stored attributes record.

As understood by those skilled in the art, in an implementation of the WLAN 200 in which the AP BC does not periodically transmit instances of the beacon frame 100 of FIG. 1, step 302 may be replaced by (i) the wireless device 210 transmitting a probe request and (ii) the AP BC transmitting a corresponding probe response, where the probe response contains the necessary network information. The rest of the processing of FIG. 3 may be the same.

Figure 4:
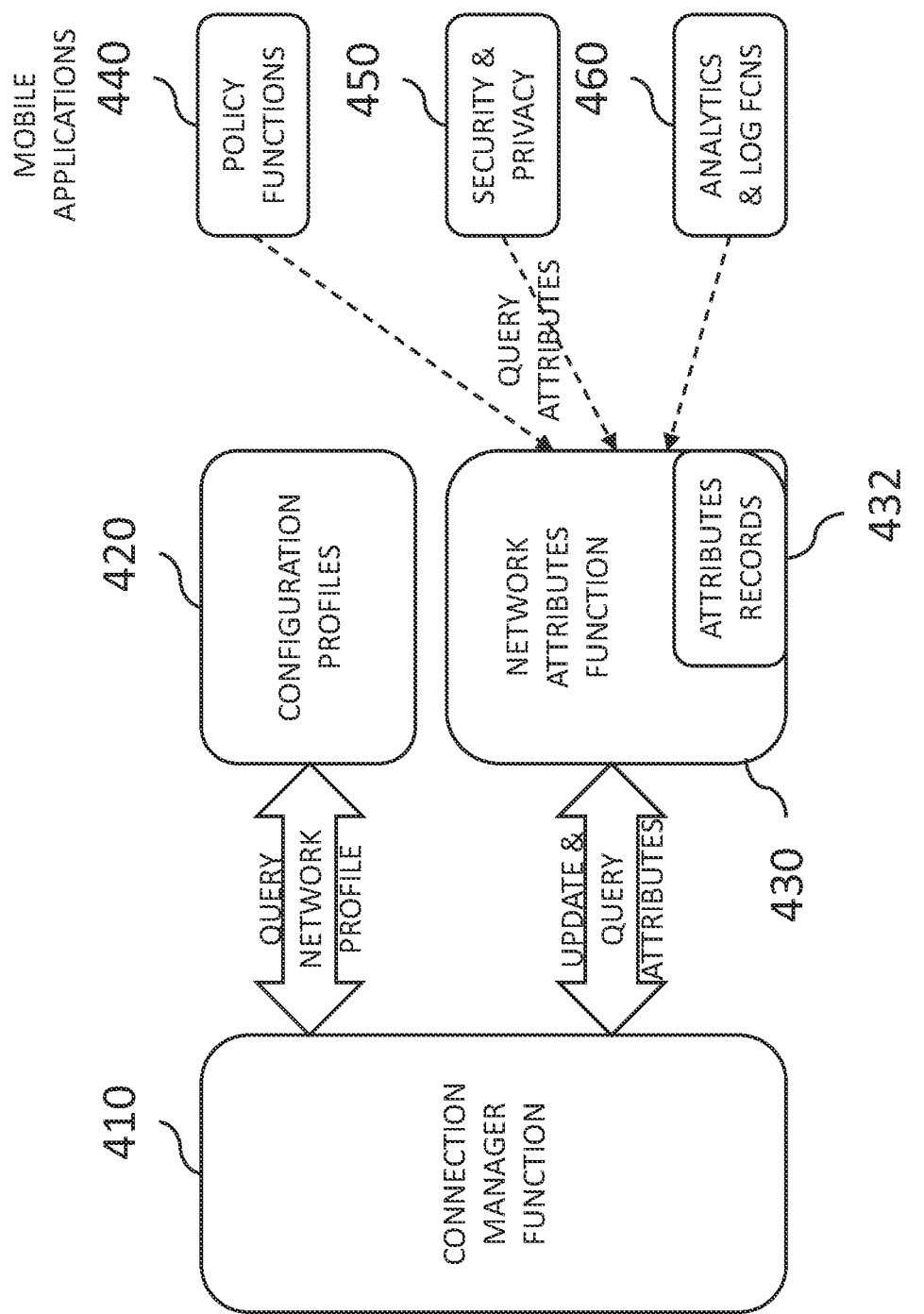
FIG. 4 is a functional block diagram of at least a portion of the software architecture for the wireless device of FIG. 2, according to certain embodiments of the disclosure.

FIG. 4 is a functional block diagram of at least a portion of the software architecture 400 for the wireless device 210 of FIG. 2, according to certain embodiments of the disclosure. As represented in FIG. 4, the software architecture includes the following modules/functions/data structures:

- Connection Manager Function 410: A Wi-Fi scanner, manager, and connector that can be part of the operating system or part of the carrier application;
- Configuration Profiles 420: A file that contains necessary attributes used by the connection manager function 410 to find and associate to a Wi-Fi network. The file contains stored configuration profiles for one or more WLANs with which the wireless device 210 has previously been associated;
- Network Attributes Function 430: A function or method used to collect, store, and maintain network attributes for associated networks. Includes storage/retrieval functions for the attributes records;
- Attributes Records 432: Stored attributes records for one or more WLANs with which the wireless device 210 has previously been associated;
- Policy Functions 440: Selects and implements network policies.
- Security & Privacy Modules 450: A required policy or rule that is implemented on the wireless device or on the network side to provide a class of service.
- Analytics & Log Functions 460: Collects key performance information for the purpose of network and device analysis.

As represented in FIG. 4, the connection manager function 410 can be used to query the configuration profiles 420 to retrieve information stored in the connection profile for a specified WLAN. The connection manager function 410 can also be used to query the attributes records 432 to retrieve information stored in the attributes record for a specified WLAN. The connection manager function 410 is able to select a network and implement policy based not only on the network SSID or provider name but also based on supported services, bandwidth, security, priority weight, and/or cost In addition, the network attributes function 430 can provide information stored in the attributes record for a specified WLAN in response to queries from mobile applications, such as the network policy functions 440, the network security & privacy functions 450, and the analytics & log functions 460. The network security & privacy functions 450 can utilize the network attributes record for the WLAN 200 to drive more accurate policy and privacy rules. The network attributes record will assist the network policy functions 440 and the network security & privacy functions 450 in rendering the correct messaging to the user. The analytics & log functions 460 can query the network attributes function 430 to include valuable information about the network and services within the analytics data or the log record which will help in troubleshooting the wireless device 210 and/or the WLAN 200.

Device Registration

In some embodiments of the present disclosure, a wireless device is required to register with the wireless network. In order to satisfy that requirement, the VSEs transmitted from an access point of the wireless network to the wireless device in a beacon frame include an address for the wireless network's registration server. Depending on the implementation, the registration server address may be a secure URL (https), a domain name, or an IP address.

Figure 5:
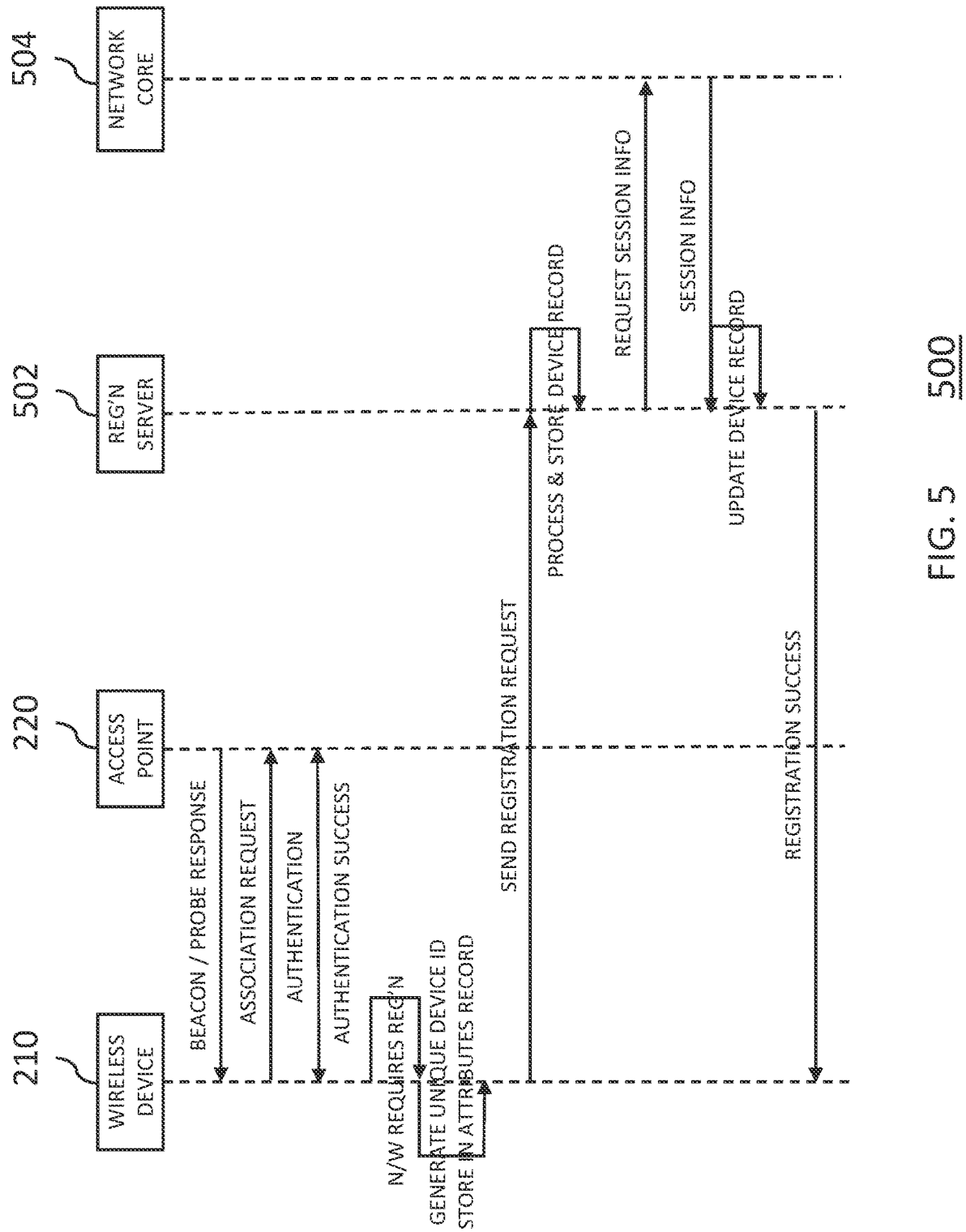
FIG. 5 is a signal flow diagram of the process by which a wireless device registers with a wireless network, according to certain embodiments of the disclosure.

FIG. 5 is a signal flow diagram of the process 500 by which a wireless device 210 registers with a wireless network, according to certain embodiments of the disclosure, where the wireless network is represented in FIG. 5 by the access point 220, the registration server 502, and the network core 506 with its Authentication, Authorization, and Accounting (AAA) functionality.

The process 500 begins with the wireless device 210 receiving from the AP 220 a beacon (or a probe response), such as beacon 100 of FIG. 1, with VSEs containing the address of the registration server 502. This is analogous to step 302 of FIG. 3. Although not shown in FIG. 5, the wireless device 210 will then perform steps 304-312 of FIG. 3, followed by step 314 in which the wireless device 210 transmits an association request to the AP 220 and communicates with the AP 220 to successfully complete its authentication. As part of step 310 of FIG. 3, the wireless device 210 determines whether an attributes record for the network already exists in the wireless device, After authentication, the wireless device 210 determines whether registration with the wireless network is required. When the wireless device 210 registers with a network, the device will register using a unique device ID. After registration, the wireless device 210 will store the device ID in the network attributes record for that network. When the wireless device 210 associates to a network that provides a URL for the device to register, the device will check if the network attributes record stored on the device contains a device ID. If the record does not have a device ID, then the device will create a new, unique ID and register with the network. Otherwise, the device will not register and use the existing device ID found in the network record. If so and if an attributes record for the network previously existed in the wireless device, then the wireless device determines whether that network attributes record already contains a previously defined network-specific Device ID for the wireless device 210 for this particular wireless network.

If there already is a Device ID in the network attributes record, then the wireless device 210 has already been registered with the wireless network. In that case, the rest of the processing shown in FIG. 5 is not performed. Instead, the wireless device 210 transmits a notification (not shown in FIG. 5) to the registration server 502 over a secure link. For example, the wireless device 210 will send the Device ID to the registration service's https address declaring the wireless device to the registration server 502, and the registration server will respond with a registration success message (not shown in FIG. 5) to the wireless device.

Referring again to FIG. 5, if the network attributes record does not have a Device ID for the wireless device 210, then the wireless device generates such a network-specific Device ID and stores it in the network attributes record. The wireless device 210 will generate a new unique ID for each network to which the device associates and authenticates. In certain implementations, the device can generate a unique ID using a combination of (i) the service set identifier (SSID), (ii) the MAC address of the access point or the basic service set identifier (BSSID), and (iii) the registration time represented in Unix time. The connection manager 410 of FIG. 4 or a carrier application in the wireless device 210 will then transmit a registration request (e.g., in the format of an https get) to the registration server 502 using the registration server's address (e.g., a secure communication URL) recovered from the beacon 100 to register with the wireless network and to obtain access to certain services. Depending on the implementation, the registration request includes one or more of the following: the device-generated randomized unique Device ID, the temporary MAC address used for the current connection, the IP address assigned to the device and used for the current connection, and the Basic Service Set Identifier (BSSID) (i.e., MAC address) of the access point 220 to which the wireless device 210 is associated, and other information that can identify the wireless device 210 such as an International Mobile Equipment Identifier (IMEI), if available. The registration server 502 will hold information on all wireless devices that connect to the network and are successfully registered. The registration server 502 is a server application that allows a wireless device to register and provide information about the device.

In response, the registration server 502 requests session information from the wireless network core 504 (e.g., wireless gateways, authentication authorization and accounting (AAA) servers, and the Operation Support System (OSS)/Business Support System (BSS) systems) to identify and register the wireless device 210. In response, the network core 505 sends the session information to the registration server 502, which updates its record for the wireless device 210 and informs that wireless device 210 that registration was successful. A session is a temporary and interactive information interchange between two or more communicating devices. When a wireless device authenticates to a network, the network's backend system stores information about the device and the connection established by the device. This information can contain the device's temporary MAC address, the IP address assigned to the device, the username used for authentication, and the account ID associated to the username for the subscriber. In some implementations, the information also contains usage statistics for the device.

Although not represented in FIG. 5, upon successful completion of registration, the registration server 502 is able to provide the Device ID to the network core 504 to enable the wireless device 210 to access network services and policies. As described in the context of steps 318-328 of FIG. 3, the wireless device 210 retains the Device ID in the network attributes record unless and until the record times out and is deleted by the wireless device.

In certain embodiments, the present disclosure is a wireless device comprising a processor and memory storing program code executed by the processor. Prior to associating with a wireless network, the wireless device receives a message from an access point of the wireless network, wherein the message contains information identifying (i) identity of the wireless network and (ii) one or more network policies of the wireless network; the wireless device retrieves the information from the message; based on the identity of the wireless network, the wireless device determines whether a network attributes record for the wireless network already exists in the memory; if a network attributes record for the wireless network does not exist, then the wireless device creates a temporary network attributes record for the wireless network in the memory; based on the one or more network policies of the wireless network, the wireless device decides to attempt to associate to and authenticate the wireless network; and the wireless device attempts to associate to and authenticate the wireless network. After successfully associating to and authenticating the wireless network, the wireless device determines whether the network attributes record for the wireless network has expired; if the network attributes record for the wireless network has not expired, then the wireless device (i) renews the network attributes record and (ii) implements the one or more network policies of the wireless network stored in the network attributes record; and, if the network attributes record for the wireless network has expired, then the wireless device (i) deletes the network attributes record and (ii) implements one or more default network policies for the wireless network.

In at least some of the above embodiments, the message is a beacon frame.

In at least some of the above embodiments, a network policy of the wireless network is that the wireless device must register with the wireless network; the information in the message further comprises a network address associated with the wireless device; and, after successfully associating to and authenticating the wireless network, the wireless device is configured to transmit a network-specific Device ID for the wireless device to the network address as part of registering with the wireless network.

In at least some of the above embodiments, the Device ID is not a permanent Medium Access Control (MAC) address for the wireless device.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A wireless device comprising a processor and memory storing program code, such that, upon the program code being executed by the processor:
    after successfully associating to a wireless network, the wireless device is configured to:
        determine whether a network attributes record for the wireless network has expired;
        upon determining that the network attributes record for the wireless network has not expired:
            renew the network attributes record; and
            implement one or more network policies of the wireless network stored in the network attributes record; and
        upon determining that the network attributes record for the wireless network has expired:
            delete the network attributes record; and
            implement one or more default network policies for the wireless network, wherein:
                a network policy of the wireless network is that the wireless device must register with the wireless network;
                the wireless device is configured to generate a unique, device-generated, network-specific Device ID for the wireless device and transmit the unique, device-generated, network-specific Device ID to a network address as part of registering with the wireless network; and
                the unique, device-generated, network-specific Device ID is not a permanent Medium Access Control (MAC) address for the wireless device.

2. The wireless device of claim 1, wherein:
    the wireless network is a Wi-Fi network; and
    the wireless device is configured to transmit the unique, device-generated, network-specific Device ID in a Wi-Fi frame.

3. The wireless device of claim 1, wherein the wireless device is configured to associate to and authenticate the wireless network.

4. The wireless device of claim 1, wherein the wireless device is configured to generate and transmit different, unique, device-generated, network-specific Device IDs when associating to different wireless networks.

5. The wireless device of claim 1, wherein the wireless device is configured to generate the unique, device-generated, network-specific Device ID based on information associated with the wireless network.

6. The wireless device of claim 5, wherein the information associated with the wireless network comprises one or more of a service set identifier (SSID) for the wireless network, a MAC address for an access point of the wireless network, and a basic SSID (BSSID) for the wireless network.

7. The wireless device of claim 6, wherein the wireless device is configured to generate the unique, device-generated, network-specific Device ID based on a registration time for the wireless device.

8. A method for a wireless device, the method comprising:
    after successfully associating to a wireless network, the wireless device:
        determines whether a network attributes record for the wireless network has expired;
        upon determining that the network attributes record for the wireless network has not expired:
            renews the network attributes record; and
            implements one or more network policies of the wireless network stored in the network attributes record; and
        upon determining that the network attributes record for the wireless network has expired:
            deletes the network attributes record; and
            implements one or more default network policies for the wireless network, wherein:
                a network policy of the wireless network is that the wireless device must register with the wireless network;
                the wireless device generates a unique, device-generated, network-specific Device ID for the wireless device and transmit the unique, device-generated, network-specific Device ID to a network address as part of registering with the wireless network; and
                the unique, device-generated, network-specific Device ID is not a permanent Medium Access Control (MAC) address for the wireless device.

9. The method of claim 8, wherein:
    the wireless network is a Wi-Fi network; and
    the wireless device transmits the unique, device-generated, network-specific Device ID in a Wi-Fi frame.

10. The method of claim 8, wherein the wireless device associates to and authenticates the wireless network.

11. The method of claim 8, wherein the wireless device is configured to generate and transmit different, unique, device-generated, network-specific Device IDs when associating to different wireless networks.

12. The method of claim 8, wherein the wireless device is configured to generate the unique, device-generated, network-specific Device ID based on information associated with the wireless network.

13. The method of claim 12, wherein the information associated with the wireless network comprises one or more of a service set identifier (SSID) for the wireless network, a MAC address for an access point of the wireless network, and a basic SSID (BSSID) for the wireless network.

14. The method of claim 13, wherein the wireless device is configured to generate the unique, device-generated, network-specific Device ID based on a registration time for the wireless device.

* * * * *